United States Patent [19]

Hori

[11] Patent Number: 4,538,226
[45] Date of Patent: Aug. 27, 1985

[54] BUFFER CONTROL SYSTEM

[75] Inventor: Kiyoshi Hori, Tokyo, Japan

[73] Assignee: NEC Corporation, Japan

[21] Appl. No.: 573,745

[22] Filed: Jan. 25, 1984

[30] Foreign Application Priority Data

Jan. 27, 1983 [JP] Japan ................................. 58-11841

[51] Int. Cl.³ .............................................. G06F 13/00
[52] U.S. Cl. .................................................... 364/200
[58] Field of Search ... 364/200 MS File, 900 MS File

[56] References Cited

U.S. PATENT DOCUMENTS 4,156,906  5/1979  Ryan ................................... 364/200
4,225,922  9/1980  Porter ................................ 364/200
4,245,303  1/1981  Durvasula et al. ................. 364/200

Primary Examiner—James D. Thomas
Assistant Examiner—David Y. Eng
Attorney, Agent, or Firm—Sughrue, Mion, Zinn, Macpeak and Seas

[57] ABSTRACT

In a data processing system, an apparatus for controlling the delivery of write data from a processing unit with a buffer device to a main store. The delivery of data from the buffer device to the main store is delayed until a counter detects a predetermined value. Where data are to be written into a same address of the main store, a write request is applied to the main store by merging successive write operations on the same address into a single write operation.

4 Claims, 3 Drawing Figures

BUFFER CONTROL SYSTEM

BACKGROUND OF THE INVENTION

The present invention relates to a buffer control apparatus applicable to a data processing system for controlling delivery of data to a store.

Generally, a main store reads or writes data at a speed which is lower than a read or write requesting speed of a processing unit and, therefore, waiting is involved in writing data into the main store in response to successive write requests. Systems elaborated to eliminate such a drawback are disclosed in U.S. Pat. No. 4,156,906 and U.K. Patent Application GB No. 2,010,547A, for example. In the disclosed systems, a processing unit is furnished with a write buffer device so that data may be written into the write buffer device and, after the write operation, a write request may be fed from the write buffer device to the main store when the main store is empty.

Although the write buffer device installed in the systems described above commonly accommodate one write command, even a buffer device capable of stacking a plurality of write commands therein causes write requests to be delivered sequentially to the main store. Therefore even when local write commands are sequentially applied for a common address region of the main store, the preceding write request is sent out from the write buffer device if any vacancy exists in the main store. It follows that if the succeeding write request shares the same address region with preceding one, the main store does not become empty until a processing for the latter is completed, giving rise to the problem of waiting. Especially, in a multi-processor system, an increase in the number of write commands proportionally increases write operations in the main store and, thereby, lowers the performance of the whole system.

SUMMARY OF THE INVENTION

It is therefore an object of the present invention to provide a buffer control apparatus which allows a main store to write data thereinto with efficiency.

It is another object of the present invention to provide a generally improved buffer control apparatus.

A buffer control apparatus for controlling delivery of data from a processing unit equipped with a buffer device to a main store of the present invention comprises a write command request circuit for generating a write command request signal, a write address signal, a write data signal and a write location specify signal, a store circuit for storing the write address signal, the write data signal and the write location specify signal which are supplied thereto from the write command request circuit, a counter for responding to the write command request signal from the write command request circuit by incrementing at a predetermined time interval, a command signal generator for generating a command signal when the counter reaches a predetermined value, a comparator for comparing a last write address stored in the store circuit before the command signal generator generates the command signal and an address of a subsequent request, a merging circuit for writing subsequent write data over preceding write data stored in the store circuit in response to a coincidence output of the comparator and according to a write command by a subsequent request having a write address which is coincident with the last write address, and a data read command circuit for delivering a command for reading data out of the store circuit in response to the command signal from the command signal generator.

In a data processing system, an apparatus for controlling the delivery of write data from a processing unit with a buffer device to a main store. The delivery of data from the buffer device to the main store is delayed until a counter detects a predetermined value. Where data are to be written into a same address of the main store, a write request is applied to the main store by merging successive write operations on the same address into a single write operation.

The above and other objects, features and advantages of the present invention will become more apparent from the following detailed description taken with the accompanying drawing.

DESCRIPTION OF THE PREFERRED EMBODIMENT

While the buffer control apparatus of the present invention is susceptible of numerous physical embodiments, depending upon the environment and requirements of use, a substantial number of the herein shown and described embodiment have been made, tested and used, and all have performed in an eminently satisfactory manner.

Figure 1:
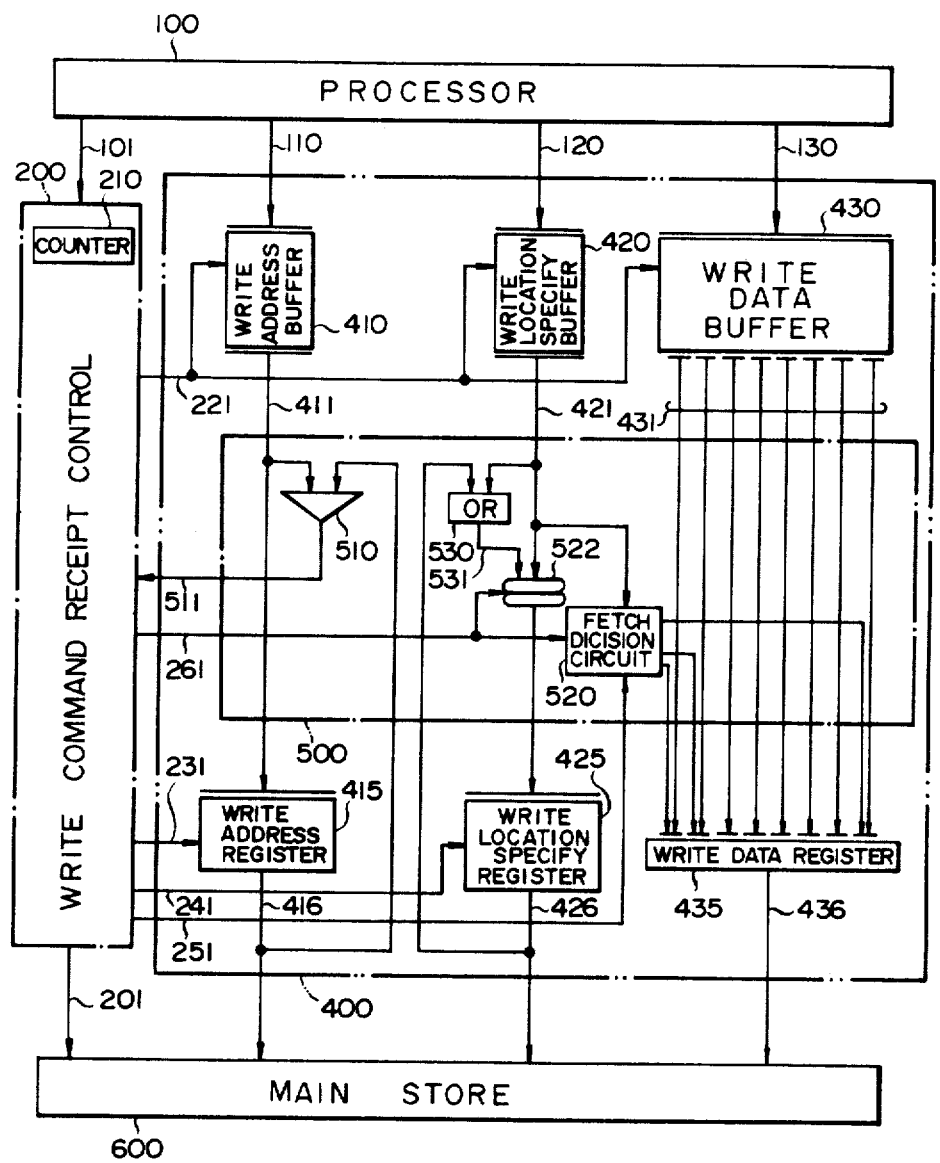
FIG. 1 is a diagram of a buffer control apparatus embodying the present invention.
Figure 2:
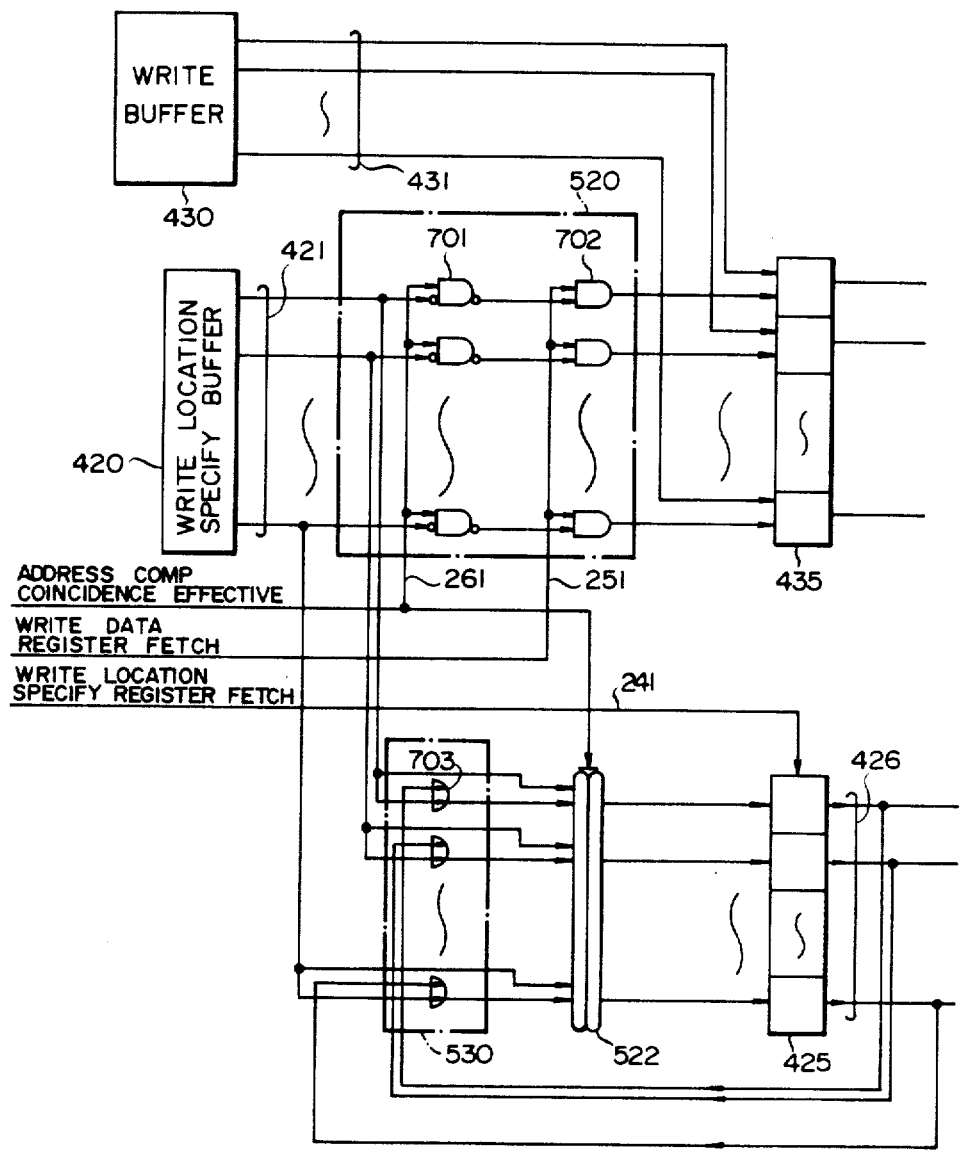
FIG. 2 is a diagram showing details of part of the apparatus shown in FIG. 1.

Referring to FIG. 1 of the drawing, a buffer control apparatus of the present invention comprises a processing unit 100, a write command receipt control circuit 200 which is provided with a counter 210, a buffer circuit 400 including a write address buffer 410, a write location specify buffer 420, a write data buffer 430, a write address register 415, a write location specify register 425, a write data register 435 and a merge command circuit 500, and a main memory or store 600. The merge command circuit 500 comprises a write address comparator 510, a write data register fetch decision circuit 520, a selector 522 and a write location decision OR gate circuit 530. As shown in FIG. 2, the fetch decision circuit 520 comprises a plurality of gates 701 and a plurality of gates 702. The write location decision circuit 530 comprises a plurality of gates 703.

In the construction shown in FIG. 1, when the processor 100 is to write data in the main store 600, it sends out an address to a write address line 110, a write location specify data to a write location specify line 120, and write data to a write data line 130, while notifying it to the write command receipt control 200. If the buffer circuit 400 has any vacancy for buffering a new write request, the write command receipt control 200 causes the write address buffer 410, write location specify buffer 420 and write data buffer 430 via a control signal line 221 to read or fetch the respective data in their predetermined locations.

Although not shown in the drawing, addressing the write address buffer 410, write location specify buffer 420 and write data buffer 430 is controlled by a pointer which steps at each time of writing, and a pointer which steps at each time of delivery. When the difference between the two pointers is "0", it shows that the buffer is empty; when the difference lies in a range smaller than a given value (capacity of the buffer), it shows that information concerned with awaiting delivery is stored in the write address buffer 410, write location specify buffer 420 and write data buffer 430. While the buffers 410, 420 and 430 are full as represented by the difference between the pointers which is the capacity of the buffer, the write command receipt control 200 rejects the request from the processor 100 and forces it to wait until a vacancy develops.

When the write address register 415, write location specify register 425 and write data register 435 are empty, the write command receipt control 200 instructs the register 415 via a write address fetch line 231 to fetch data from the write address buffer 410 via an output signal line 411, instructs the register 425 via a write location specify register fetch line 241 to fetch data from the write location specify buffer 420 via an output signal line 421 and the selector 522, and instructs the register 435 via a write data register fetch line 251 to fetch data from the write data buffer 430 via output lines 431.

When the write address buffer 410, write location specify buffer 420 and write data buffer 430 are empty after the respective data have been read into the write address register 415, write location specify register 425 and write data register 435, the counter 210 is activated. On the activation, the counter 210 steps for each machine cycle and, when reached a predetermined value, generates a delivery command signal. The address comparator 510 compares data on an output line 416 of the write address register 415 and data on the output line 411 of the write address buffer 410. If non-coincidence is notified to the write command receipt control 200 via an output line 511 of the comparator 510 as a result of the comparison, the counter 210 generates a command signal in response to which the control 200 delivers a write request to the main store 600 via a write request line 201. The control 200 commands fetching by the write address register 415, write location specify register 425 and write data register 435, thereby loading them with the respective data. If any subsequent write request still resides in the buffers 410, 420 and 430, the counter 210 will not be activated. The write command receipt control 200 is operated on the basis of a result of comparison performed by the address comparator 510.

Under the conditions that a fetch command has been delivered to all the register 415, 425 and 435, that no write request resides any longer in the buffers 410, 420 and 430, and that the counter 210 has reached a predetermined value to generate a command signal after the activation thereof, the write command receipt control 200 causes the write address to appear on the output line 416, write location specify data on an output line 426, and write data on an output line 436, each from its associated register. At the same time, the control 200 supplies a write request to the main store 600 via the write request line 201.

In response to the acceptance of the write request by the main store 600, the write address register 415, write location specify register 425 and write data register 435 become empty. Under this condition, the next write request to the main store 600 is prepared. If the main store 600 does not accept the write request dealing with the preceding operation, the write command receipt control 200 continuously delivers the write request to the main store 600 via the line 201 until accepted. When the registers 415, 425 and 435 have become empty, the control 200 sends out commands to the fetch lines 231, 241 and 251 such that the registers 415, 425 and 435 individually fetch information from their associated buffers 410, 420 and 430 which is concerned with the next write request. If information concerned with the next write request does not reside in the buffers 410, 420 and 430, the counter 210 is triggered. The write request to the main store 600 is not accepted until the counter 210 generates a command signal.

While the write request to the main store 600 is kept waiting at the registers 415, 425 and 435, the processor 100 applies the next write command request to the write command receipt control 200 via a line 101 so that the write address, specified write location and data are respectively fetched into predetermined locations of the buffers. Thereafter, the control 200 checks a status of an output signal of the address comparator 510. The address comparator 510, comparing the output of the register 415 with the subsequent write request from the associated buffer 410 (output 411 of the buffer), supplies a coincidence signal to the control 200 via the line 511. The write location specify OR gate circuit 530 provides OR of a plurality of output signals of the register 425 and a plurality of output signals of the associated buffer 420 in bit-by-bit correspondence. Therefore, the control 200 causes the selector 522 to select the output of the OR gate circuit 530 by way of a coincidence effective line 261.

Further, the control 200 delivers a command via the line 241 such that the output of the selector 522 is fetched by the write location specify register 425. The signals output from the control 200 are also routed to the write data register fetch circuit 520 via the lines 261 and 251 respectively. The circuit 200 instructs the write data register 435 to fetch only those output signal lines 431 of the write data buffer 430 which are specified by the output line 421 of the write location specify buffer 420. The contents of the data register 435 in those locations which are not specified by the output line 421 are retained as they are. This operation will hereinafter be termed "merging".

After the counter 210 has been activated and before it generates a command signal, the processor 100 delivers another write command request to the write command receipt control 200. When the write address, specified write location and data are present in predetermined locations of the buffers or they have been fetched therein, the control 200 checks a status of the output signal line 511 of the write address comparator 510. If the comparator output is indicative of coincidence, merging of the specified write location and write data occurs as previously mentioned. The address comparator 510 compares the signal on the output line 416 of the write address register 415 and the signal on the output line 411 of the write address buffer 410. If the output of the address comparator 510 fed to the control 200 is indicative of non-coincidence, the counter 210 associated with the control 200 generates a command signal. In response to this signal, the control 200 delivers a write request to the main store 600 via the line 201.

Reference will be made to FIG. 2 for describing the merging of the write location specify data and the write data.

When the control 200 has commanded fetching of data by the data register 435 via the line 251, a signal indicative of a result of comparison performed by the address comparator 510 is delivered via the line 261. If the result of comparison is non-coincidence, the signal on the line 261 is logical "0" and, therefore, the outputs of all the OR gates 701 are logical "1". The AND gates 702 provide AND of the outputs of the OR gates 701 and the signal on the line 251. As a result, all the outputs of the write data buffer 430 are loaded into the write data register 435 via the lines 431. If the result of comparison is coincidence, on the other hand, the signal on the line 261 is logical "1" making only part of the OR gates 701, which correspond to logical "1" of the output line 421 of the write location specify buffer 420, logical "1". The AND gates 702, therefore, produce logical "1" outputs in response to logical "1" outputs of the buffer 420, the outputs of the buffer 430 being fetched by the register 435.

Concerning fetching by the write specify register 425, the signal on the control line 261 is used to drive the selector 522. If the result of comparison is non-coincidence, the selector 522 is caused to select an output signal of the write location specify buffer 420 which appears on the line 421; if the result is coincidence, then outputs of the OR gates 703 which provide AND of an output of the write location specify register 425 coupled via the line 426 and an output of the associated buffer 420 coupled via the line 421. When fetching by the register 425 has been commanded via the line 241, the register 425 fetches an output of the selector 522.

Figure 3:
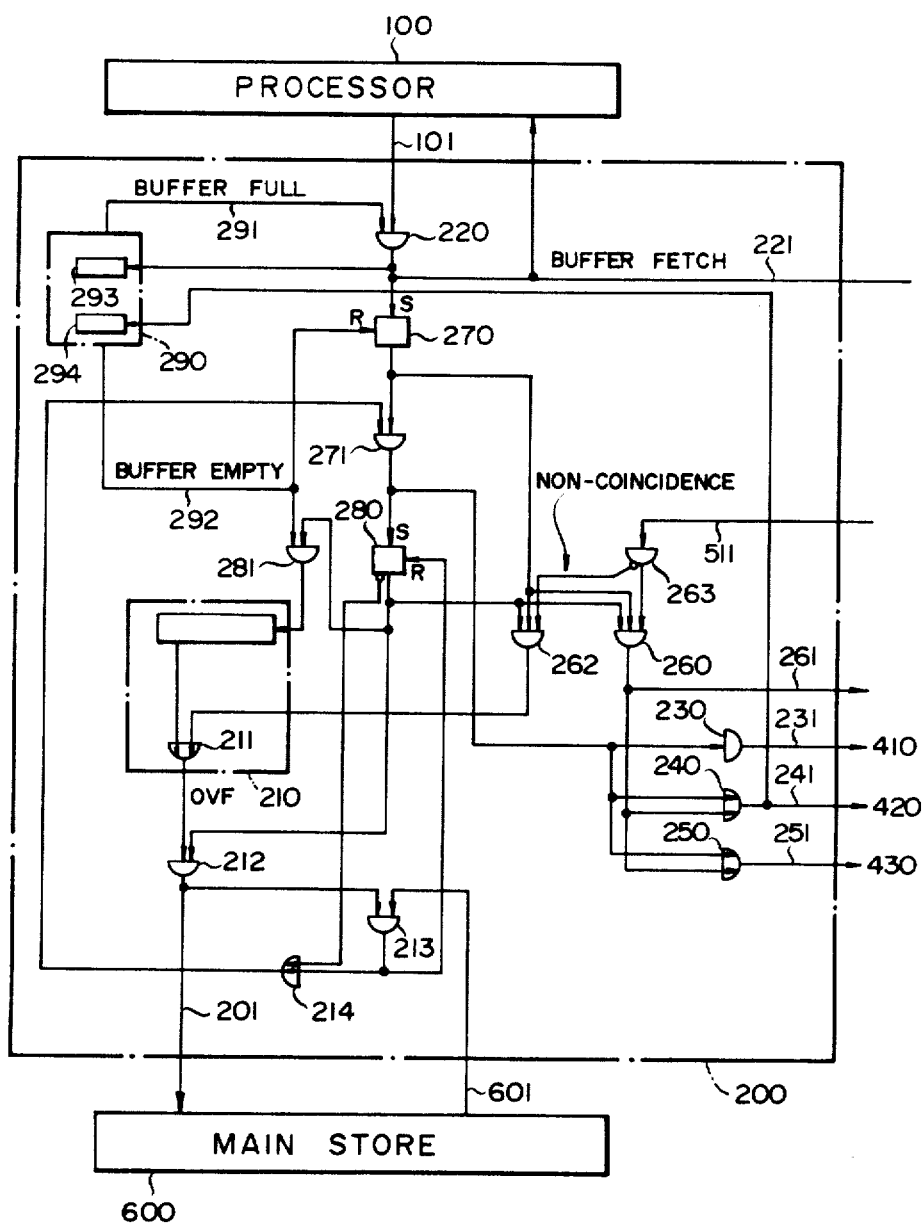
FIG. 3 is a diagram showing details of a write command receipt control circuit included in the apparatus of FIG. 1.

Details of the write command receipt control 200 are shown in FIG. 3. As shown, an AND gate 220 provides AND of a write request coupled to the control 200 via the line 101 and a signal on a buffer full line 291 from a pointer control circuit 290. When the buffer is not full, fetching of data into the buffer is commanded via the line 221 while the acceptance of the write command request is notified to the processor 100. Then, an input pointer 293 is caused to step and a flip-flop (F/F) 270 is set. Although not clearly shown in the drawing, addressings of the write location specify buffer 420 and write data buffer 430 are controlled by the input pointer 293 which steps at each time of writing and an output pointer 294 which steps at each time of delivery. When the difference between the two pointers indicates a buffer capacity, it represents that the buffer is full; when it is "0", then that the buffer is empty. Further, when the difference is smaller than the buffer capacity, it shows that data resides in the buffer.

After the buffer has fetched the data, an AND gate 271 determines whether the write address register 415, write location specify register 425 and write data register 435 (termed "write registers" collectively hereinafter) are empty, and whether a write request 201 has been fed to the main store 600 and can be accepted (when an F/F 280 is not set and when the AND gate 213 is enabled, and indicated by logical "1" output of an OR gate 214). When the logical output level of the OR are 214 is "1", it is possible to fetch data into the write registers and, therefore, the AND gate 271 is enabled. Loading the write address register 415 shown in FIG. 1 is commanded via an output line 231 of a buffer gate 230. Loading the write location specify register 425 and write data register 435 shown in FIG. 1 is commanded via output signal lines 241 and 251 of OR gates 240 and 250. The output of the OR gate 240 is indicative of delivery of data from the buffer to the write registers. This causes the output pointer 294 to step. The output of the AND gate 271 sets the F/F 280 which indicates that the write register is busy. The F/F 270 is reset by an output signal 292 of the pointer control 290 which indicates that the buffer is empty.

Setting the F/F 270 has priority to resetting. Therefore, it remains set when received a write command request 101 simultaneously with the pointer control output 292. When the F/F 280 is set and the buffer is empty, the output of the AND gate 281 becomes logical "1" to activate the counter 210. When no write request has followed after the activation of the counter 210 and the counter 210 has reached a predetermined value to cause an OR gate 211 to produce a command signal, an AND gate 212 provides AND of the command signal and the output of the F/F 280. The AND is routed to the main store 600 via the line 201.

When the main store 600 is ready to accept the write request, an output thereof is supplied to the write command receipt control 200 via a line 601 to thereby enable an AND gate 213. The output of the AND gate 213 is routed to the F/F 280 as a reset signal and, also, to the OR gate 214, setting up a condition on which the subsequent write command is to be fetched by the write registers. While the write request to the main store 600 is waiting in the write registers until the counter 210 generates a command signal after activation, the processor 100 delivers the next write command request 101. When the buffer has fetched data or when the subsequent write request 101 is present in the buffer, that is, when both the F/Fs 270 and 280 are set, the data on the output line 511 of the address comparator 510 is received by a buffer gate 263.

If the result of comparison is coincidence, an AND gate 260 is enabled to supply the write location specify register 425 and write data register 435 with a command for fetching the subsequent write request data via the line 261 and the lines 241 and 251. Further, a command is delivered for causing the output pointer 294 to step. Thereafter, the previously discussed merging is performed when a write request based on address coincidence appears after the counter detects a predetermined value to cause the OR gate to produce a command signal.

When the result of comparison performed by the address comparator 510 and coupled to the control 200 via the line 511 is non-coincidence, an AND gate 262 is enabled so that a command generated by the counter 210 is fed through the OR gate 211. The AND gate 212 provides AND of the output of the F/F 280 and the counter output, so that a write request 201 is applied to the store 600. This is followed by the same operation as the previously described.

While the counter in the illustrative embodiment is designed to deliver a delivery command after five machine cycles as counted from the instant of activation of the counter, its value may be made variable and changed from the outside, if desired.

In summary, it will be seen that the present invention provides a buffer control system which allows a store to efficiently write data thereinto. This is derived from the inherent construction wherein the delivery of data from buffers to a store is delayed until a counter detects a predetermined value so that, where data are to be written into a same address, the successive write operations on the common address may be merged into a single operation to apply a write request to the store.

Various modifications will become possible for those skilled in the art after receiving the teachings of the present disclosure without departing from the scope thereof.

What is claimed is:

1. A buffer control apparatus for controlling delivery of data from a processing unit equipped with a buffer device to a main store, comprising:
   write command request means for generating a write command request signal, a write address signal, a write data signal and a write location specify signal;
   store means for storing the write address signal, the write data signal and the write location specify signal which are supplied thereto from said write command request means;
   counter means for responding to the write command request signal from the write command request means by incrementing at a predetermined time interval;
   command signal generator means for generating a command signal when said counter means reaches a predetermined value;
   comparator means for comparing a last write address stored in the store means before the command signal generator means generates the command signal and an address of a subsequent request;
   merging means for writing subsequent write data over preceding write data stored in the store means in response to a coincidence output of the comparator means and according to a write command by a subsequent request having a write address which is coincident with the last write address; and
   data read command means for delivering a command for reading data out of the store means in response to the command signal from the command signal generator means.

2. A system as claimed in claim 1, in which the write command request means constitutes part of the processing device.

3. A system as claimed in claim 1, in which the store means, the comparator means, the merging means and the data read command means constitute the buffer device.

4. A system as claimed in claim 1, in which the counter means and the command signal generator means constitute write command receipt control means.

* * * * *